(12) United States Patent
Hwang

(10) Patent No.: US 9,519,869 B2
(45) Date of Patent: Dec. 13, 2016

(54) PREDICTIVE COMPUTER SYSTEM RESOURCE MONITORING

(71) Applicant: International Business Machines Corporation, Armonk, NY (US)

(72) Inventor: Jinwoo Hwang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 14/089,098

(22) Filed: Nov. 25, 2013

(65) Prior Publication Data

US 2015/0149393 A1   May 28, 2015

(51) Int. Cl.
G06F 15/18     (2006.01)
G06N 99/00     (2010.01)

(52) U.S. Cl.
CPC .................... G06N 99/005 (2013.01)

(58) Field of Classification Search
None
See application file for complete search history.

(56) References Cited

U.S. PATENT DOCUMENTS

| | | | | |
|---|---|---|---|---|
| 5,210,872 A * | 5/1993 | Ferguson | .............. | G06F 9/4887 718/102 |
| 7,895,247 B2 * | 2/2011 | Hankin | ............... | G06F 11/3409 707/812 |
| 8,350,863 B2 | 1/2013 | Corbett et al. | | |
| 8,358,752 B2 * | 1/2013 | Shaw | ...................... | H04W 4/18 379/88.14 |
| 8,458,715 B1 * | 6/2013 | Khosla | ...................... | G06F 9/50 702/104 |
| 2003/0018959 A1 * | 1/2003 | Wallman | ............. | G06F 9/45516 717/148 |
| 2006/0095427 A1 * | 5/2006 | Dickenson | ............ | G06F 11/362 |
| 2007/0239882 A1 * | 10/2007 | Lai | ...................... | H04L 65/4084 709/231 |
| 2009/0055166 A1 * | 2/2009 | Moyle | ................. | G06F 21/6227 704/9 |

(Continued)

FOREIGN PATENT DOCUMENTS

| | | | | | |
|---|---|---|---|---|---|
| AU | WO 2006020325 A2 * | 2/2006 | ............ | G06Q 30/04 |
| CN | 102244685 A | 11/2011 | | |

(Continued)

OTHER PUBLICATIONS

Gao, N. et al.; "A Resource Reservation Algorithm with Muti-parameters"; 2011 Sixth ChinaGrid Annual Conference (ChinaGrid); pp. 211-214; IEEE Computer Society; 2011.

(Continued)

*Primary Examiner* — Paulinho E Smith
(74) *Attorney, Agent, or Firm* — Terrile, Cannatti, Chambers & Holland, LLP; Robert W. Holland

(57) ABSTRACT

A method, system and computer-usable medium are disclosed for monitoring a computer system to predict failed or degraded operational states and respond with an alarm or corrective action. Resource collection and consumption are analyzed to derive velocity and acceleration. A hidden Markov model with the resource collection and consumption data as observation spaces predicts computer system state spaced indicative of a failed or degraded computer system operating state.

16 Claims, 5 Drawing Sheets

(56) References Cited

U.S. PATENT DOCUMENTS

| | | | | |
|---|---|---|---|---|
| 2010/0317420 | A1* | 12/2010 | Hoffberg | G06Q 30/0207 463/1 |
| 2011/0032257 | A1* | 2/2011 | Peterson | G06T 15/005 345/420 |
| 2011/0106737 | A1* | 5/2011 | Siddalingaprabhu | G06F 9/4881 706/13 |
| 2011/0225595 | A1* | 9/2011 | Chujo | G05B 19/0426 718/106 |
| 2012/0089664 | A1* | 4/2012 | Igelka | G06F 9/5083 709/203 |
| 2012/0271845 | A1* | 10/2012 | Netz | G06F 17/30412 707/769 |
| 2013/0111490 | A1* | 5/2013 | Baruch | G06F 9/5005 718/104 |
| 2013/0304826 | A1* | 11/2013 | Li | H04L 51/14 709/206 |
| 2014/0180738 | A1* | 6/2014 | Phillipps | G06N 99/005 705/7.12 |
| 2014/0207724 | A1* | 7/2014 | Ledenev | G06F 21/316 706/47 |
| 2015/0143381 | A1* | 5/2015 | Chin | G06F 9/485 718/104 |
| 2015/0149393 | A1* | 5/2015 | Hwang | G06N 99/005 706/12 |
| 2015/0309813 | A1* | 10/2015 | Patel | G06F 8/75 703/22 |
| 2015/0347181 | A1* | 12/2015 | Myrick | G06F 9/44594 718/102 |

FOREIGN PATENT DOCUMENTS

| | | | | |
|---|---|---|---|---|
| EP | 0518574 | A2 * | 12/1992 | G06F 11/323 |
| WO | 2006020325 | A2 | 2/2006 | |
| WO | WO 2005043414 | A3 * | 3/2006 | G06F 11/3409 |
| WO | WO 2007068575 | A1 * | 6/2007 | G06F 11/3466 |

OTHER PUBLICATIONS

Internet Society et al.; "Goals and functional requirements for inter-autonomous system routing"; An IP.com Prior Art Database Technical Disclosure; http://ip.com/IPCOM/000001936D; Sep. 12, 2000.

IBM; "Autonomous Resource Management Program: Resource Supervision amongst Processes and Hosts"; An IP.com Prior Art Database Technical Disclosure; http://ip.com/IPCOM/000126250D; Jul. 11, 2005.

* cited by examiner

PREDICTIVE COMPUTER SYSTEM RESOURCE MONITORING

BACKGROUND OF THE INVENTION

Field of the Invention

The present invention relates in general to the field of computers and similar technologies, and in particular to software utilized in this field. Still more particularly, it relates to a method, system and computer-usable medium for predictive computer system resource monitoring.

Description of the Related Art

Computer systems often coordinate a variety of resources to accomplish desired tasks. For example, a computer system typically includes one or more processors that execute instructions stored in random access memory to generate visual information for presentation at a display with a graphics processor. The processors and memory often support multiple applications simultaneously that perform desired tasks, such as word processing, spreadsheet calculations, web browsing, serving web pages, storing data in persistent storage devices, retrieving data, etc. A resource manager associated with the computer system typically manages the assignment of resources to perform tasks in an efficient manner. For example, an operating system might assign processing threads and memory to applications based upon the workload demands of the applications. As another example, a hypervisor assigns physical processing resources between multiple virtual machines based upon workload demands of the virtual machines and the availability of the physical processing resources.

Under normal operating conditions, the resource manager periodically performs a resource collection that aligns processing demands for tasks with physical processing resources. A task is provided access to resources collected for the task based upon the demands faced by the task and based upon the available resources. For example, a web server is provided access to a limited portion of processing threads and memory based upon the demands of client requests placed upon the web server and the demands of other tasks that share the physical resources of the web server. The web server is allowed to use the collected resources and the actual resource consumption of the web server is monitored by the resource manager. At the next resource collection, the resources assigned to the web server adapt based upon the resource consumption of the web server and the resource consumption of other tasks that share resources with the web server.

One difficulty that arises with periodic resource collection responsive to monitoring of resource consumption is that a failure in task performance can lead to inefficient resource collection and consumption. For instance, an application that hangs, crashes or otherwise suffers performance degradation can impact other tasks before the difficulty is detected and corrected. In some instances, a relatively minor application error can impact the performance of other more important and unrelated tasks in unpredictable and negative ways.

SUMMARY OF THE INVENTION

A method, system and computer-usable medium are disclosed for managing computer system operations to perform tasks. Resource collection and consumption are tracked at a computer system, such as by the assignment and use of processing and memory resources at applications. A resource manager derives velocity and acceleration for each of the resource collection and resource consumption information over time. The resource manager applies the resource collection, resource collection velocity, resource collection acceleration, resource consumption, resource consumption velocity and resource consumption acceleration as observation spaces in a hidden Markov model to predict computer system state spaces indicative of a pending computer system failure, such as with a Viterbi algorithm. If the probability of a failure exceeds a threshold, the resource manager performs a responsive action, such as issuing an alarm or a corrective action for the task associated with the predicted failure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
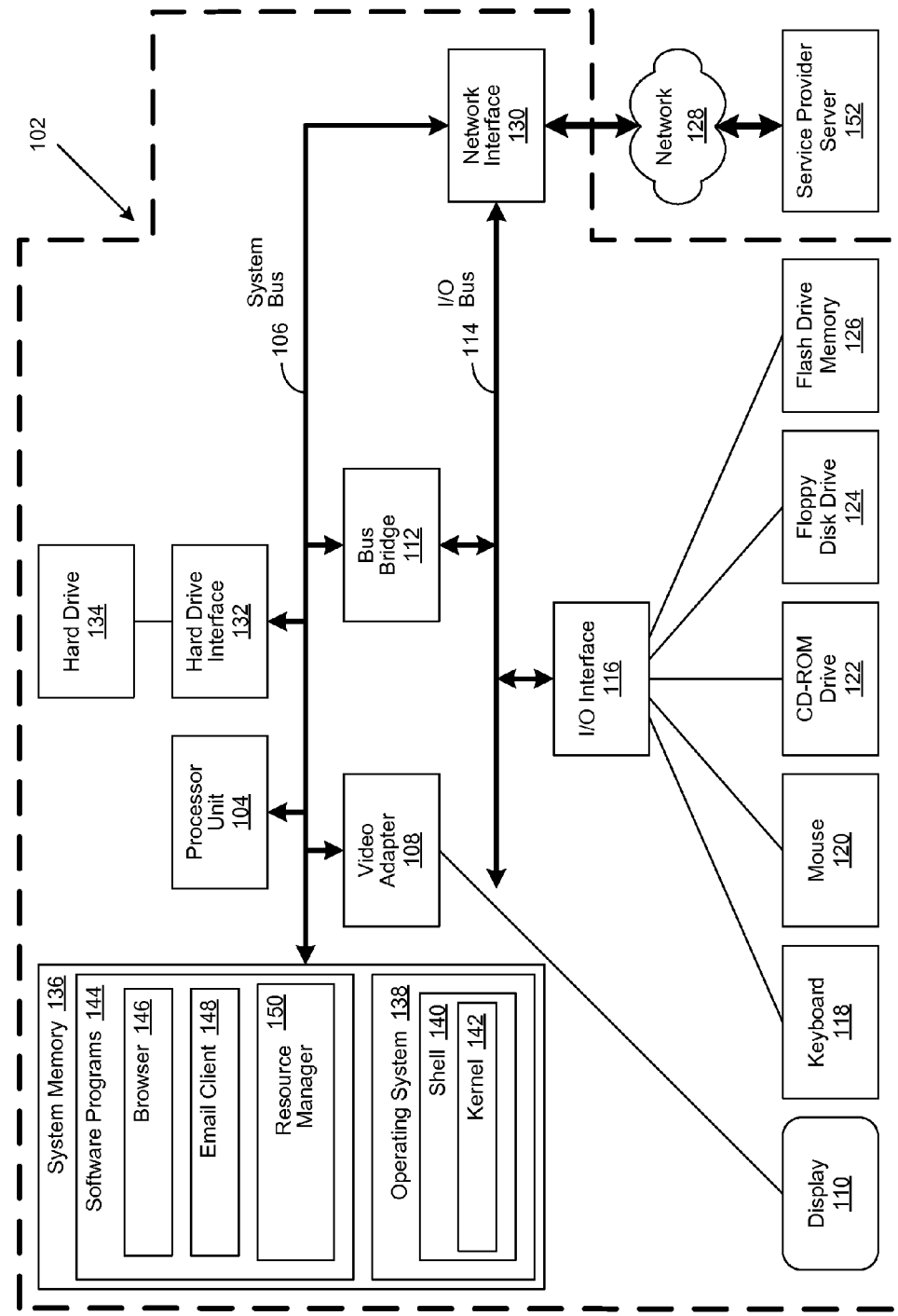
FIG. 1 depicts an exemplary client computer in which the present invention may be implemented.

A method, system and computer-usable medium are disclosed for monitoring computer system task performance with a hidden Markov model generated from derivatives of computer system resource collection and consumption. Predictions by the hidden Markov model of predetermined operational state spaces having a predetermined threshold generate predetermined actions, such as an alarm or a corrective action to the task.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a resource manager 150 that monitors processing and memory resources with a hidden Markov model. In these and other embodiments, the resource manager 150 includes code for implementing the processes described hereinbelow. In one embodiment, client computer 102 is able to download the resource manager 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
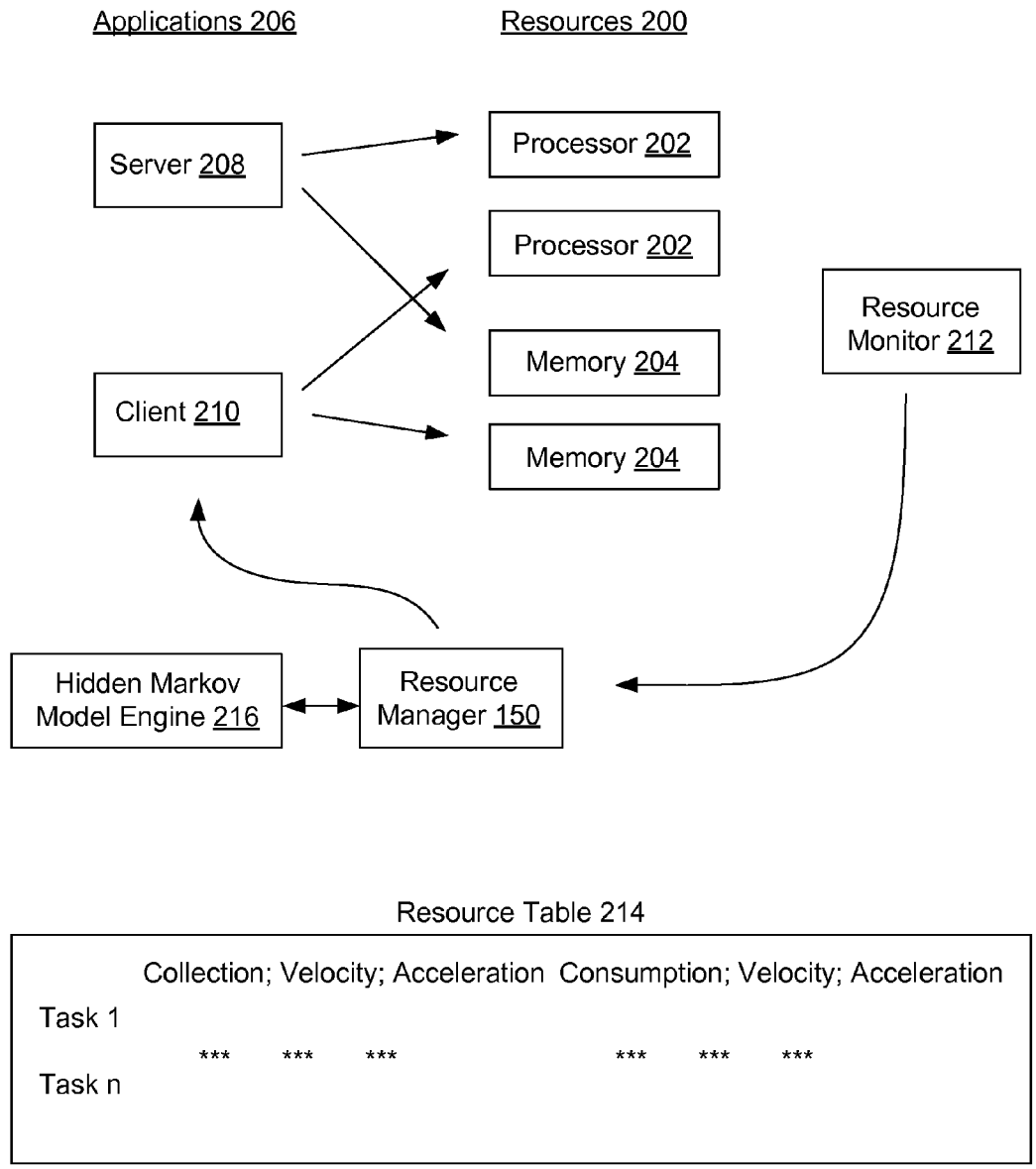
FIG. 2 is a simplified block diagram of computer system tasks and resources monitored with a resource manager having a hidden Markov model.

FIG. 2 is a simplified block diagram of computer system tasks and resources monitored with a resource manager having a hidden Markov model. Resources 200 depicted by the example embodiment of FIG. 2 include plural processors 202 and plural memory sets 240. In alternative embodiments, resources may be collected and consumed in a variety of different manners, such as processor threads or cycles and memory blocks or similar quantifications. Resources may also include a variety of different computer system assets, such as networking bandwidth, wireless networking bandwidth, graphics processing graphics memory, persistent storage space, persistent storage accesses, etc. . . . Resources 200 support computer system operations by executing, storing, communicating or otherwise managing information under the direction of applications 206. In the example embodiment, applications include a server virtual machine 208 that serves web pages and a client virtual machine that retrieves web pages. In alternative embodiments, applications 206 might include a variety of other types of applications that request and consume computer system resources. For example, applications 206 may be cloud-based applications that execute different computer systems, local-based applications that execute on different processors of the same computer system or local-based applications that execute on the same processor with assignable numbers of threads.

Resource manager 150 assigns resources 200 to support applications 206 based upon predetermined priority factors. As an example, resource manager 150 is a hypervisor that manages assignment of virtual machines to physical resources. Alternatively, resource manager 150 is a firmware-based management tool that allocates resources 200 to applications 206 based upon the importance of each application 206 and the availability of resources 200. In one embodiment, resource manager 150 dynamically adjusts resource allocation with a periodic resource collection and resource consumption cycle. At an initial time, resources are collected by each application 206 according to that application's priority and workload, with resource manager 150 assigning resources in response to a resource collection request of each application based upon the availability of resources. Resource manager 150 determines the availability of resources based in part upon how resources are assigned in response to resource collection request and also based in part upon the actual consumption of resources as monitored by a resource monitor 212. For instance, resource collection provides a maximum amount of resources that applications 206 may consume but does not determine how much of the resources available to applications 206 are actually used by the applications. Resource monitor 212 may monitor total resource consumption, such as the total number of threads used by a processor or the total amount of memory used to store information, or resource monitor 212 my monitor resources on a per-application or per-task basis. In alternative embodiments, alternative measures of computer system activity may be used.

Resource manager 150 monitors computer system operational status in part by predicting potential difficulties before the difficulties cause disruption to computer system operations. Resource manager 150 maintains a resource table 214 that tracks resource collection and consumption by tasks over time, such as by tracking the processor and memory allocated to and used by applications at each collection period. Resource manager 150 also derives velocity and acceleration for each resource collection and resource consumption periodic datapoint. For instance, resource collection velocity is derived by subtracting the immediately previous time period resource collection value from the current resource collection value. Resource collection acceleration is derived by subtracting the immediately previous time period resource collection velocity from the current resource collection velocity. Similarly, resource consumption velocity is derived by subtracting the immediately previous time period resource consumption value from the current resource consumption value. Resource consumption acceleration is derived by subtracting the immediately previous time period resource consumption velocity from the current resource consumption velocity. Although the example embodiment uses periodic resource collection to initiate storage of datapoints, alternative triggers may be used that initiate storage of datapoints at irregular times with the velocity and acceleration data normalized for the time between capture of datapoints.

The collection, consumption and derived values stored in resource table 150 are made available to a hidden Markov model engine 216 executing in conjunction with resource manager 150. Hidden Markov model engine 216 uses the values stored in resource table 150 as observation spaces in a hidden Markov model to predict computer system state spaces, such as by applying a Viterbi algorithm. The computer system state spaces provided by the hidden Markov model present probabilities that the computer system will transition to other states, at least some of which indicate subpar computer system performance. Resource manager 150 stores threshold values for the computer system state spaces so that, if a threshold is met, an action may automatically take place, such as issuing an alarm or performing a preemptive corrective action for the task associated with the threshold, such as rebooting a virtual machine having a likelihood of entering a hung state. In order to improve predictive accuracy of the hidden Markov model, supervised learning may be applied with historic data or, alternatively, unsupervised learning may be applied with a Viterbi algorithm to adjust parameters with real time data. Some examples of computer system state spaces predicted by the hidden Markov model include a normal state, a resource contention state, a hang state, a performance degradation state and a crash state.

Figure 3:
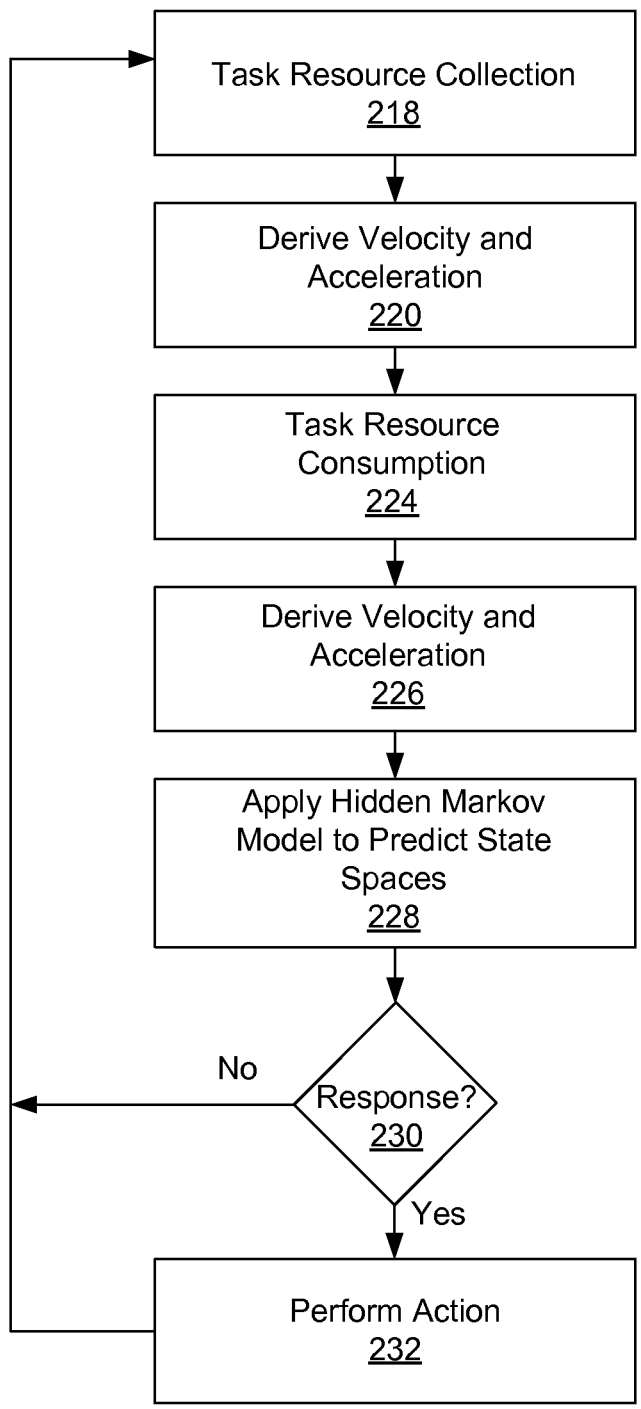
FIG. 3 is a generalized flowchart of the operation of a resource manager to monitor computer system tasks and resources with a hidden Markov model.

FIG. 3 is a generalized flowchart of the operation of a resource manager to monitor computer system tasks and resources with a hidden Markov model. The process starts at step 218 with storage a periodic time interval of the task resource collection for each of plural tasks executing under the management of a resource manager. The resource collection represents the resources allocated to each task, such as the processing threads or physical memory allocated to each of plural applications executing on a computer system. At step 220, velocity and acceleration are derived for the periodic time interval based upon the change in resource collection and resource collection velocity in a previous time interval. At step 224, task resource consumption data is stored for the time interval for each of the tasks, such as the actual processor and memory resources consumed by each application. At step 226, velocity and acceleration are derived for the periodic time interval based upon the change in resource consumption and resource consumption velocity in a previous time interval. At step 228, the resource collection and consumption information, including velocity and acceleration information, is applied in a hidden Markov model as observation spaces to predict computer system state spaces. In alternative embodiments, only portions of the resource table 214 data may be used as observation spaces in the hidden Markov model, such as just collection or just consumption information and/or derivatives. At step 230 a determination is made of whether a response threshold has been met. If not, the process returns to step 218 for monitoring the next time interval. If so, the process continues to step 232 to perform an action associated with the threshold and then returns to step 218.

Figure 4:
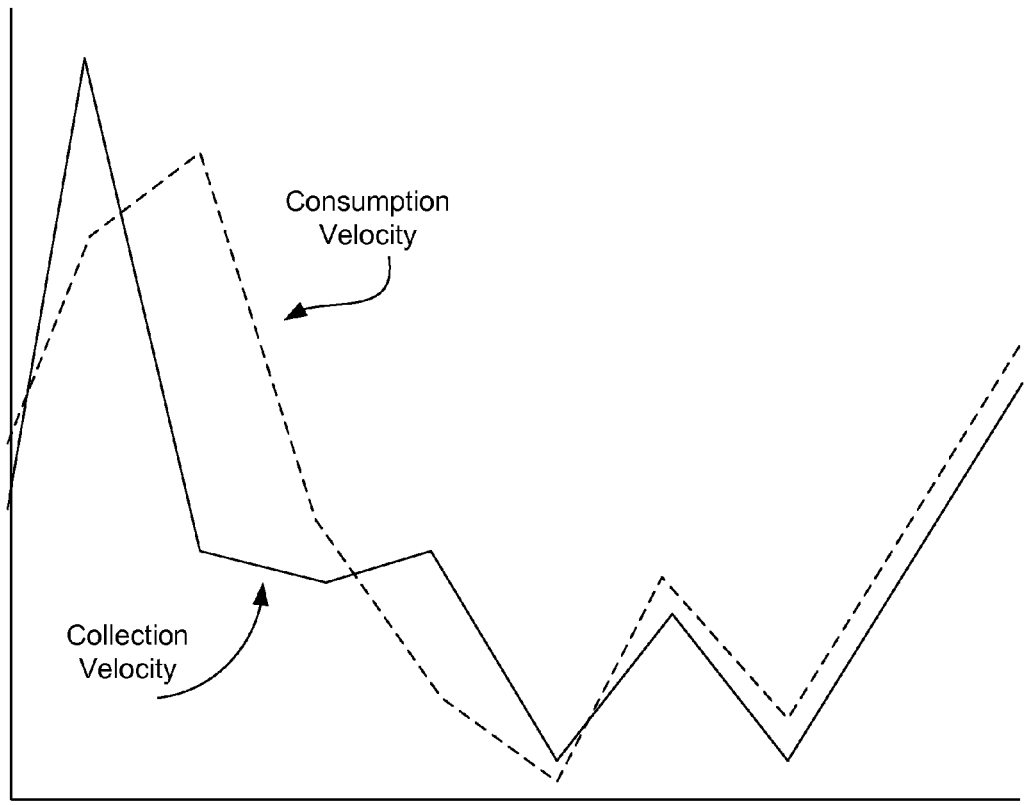
FIG. 4 is a chart of collection velocity and consumption velocity tracked by a resource manager of a computer system.

FIG. 4 is a a chart of collection velocity and consumption velocity tracked by a resource manager of a computer system. As illustrated by the chart, consumption velocity and collection velocity have a relationship that depends upon the logic that sets the amount of resources available to each task. Over time in a steady state operation the collection and consumption velocities tend to follow similar paths, however, variations can be predictive of changes related to computer system operations.

Figure 5:
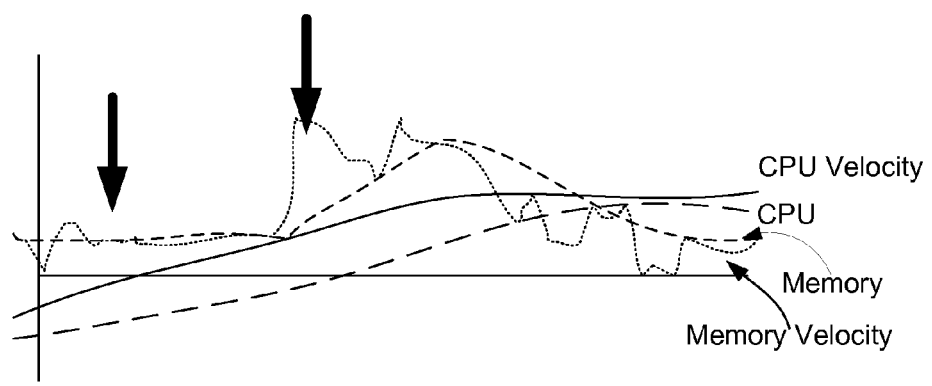
FIG. 5 is a chart of consumption velocity, acceleration and collection velocity for processing and memory resources of a computer system.

FIG. 5 is a chart of consumption velocity, acceleration and collection velocity for processing and memory resources of a computer system. The initial arrow depicted by FIG. 5 matches a pattern associated with normal computer system operations. The second arrow depicts a memory contention event in which memory use rapidly increases to restrict available memory resources. Even before memory contention peaks at the second arrow in time, the increased probability of a memory contention occurring becomes evident with a hidden Markov model. Acceleration and velocity for CPU and memory collection and consumption indicate the increased risk that memory will have excessive demands. Earlier warning of the upcoming memory contention allows increased time to react and a greater potential for corrective actions to take effect before a predicted difficulty impacts computer system performance.

Figure 6:
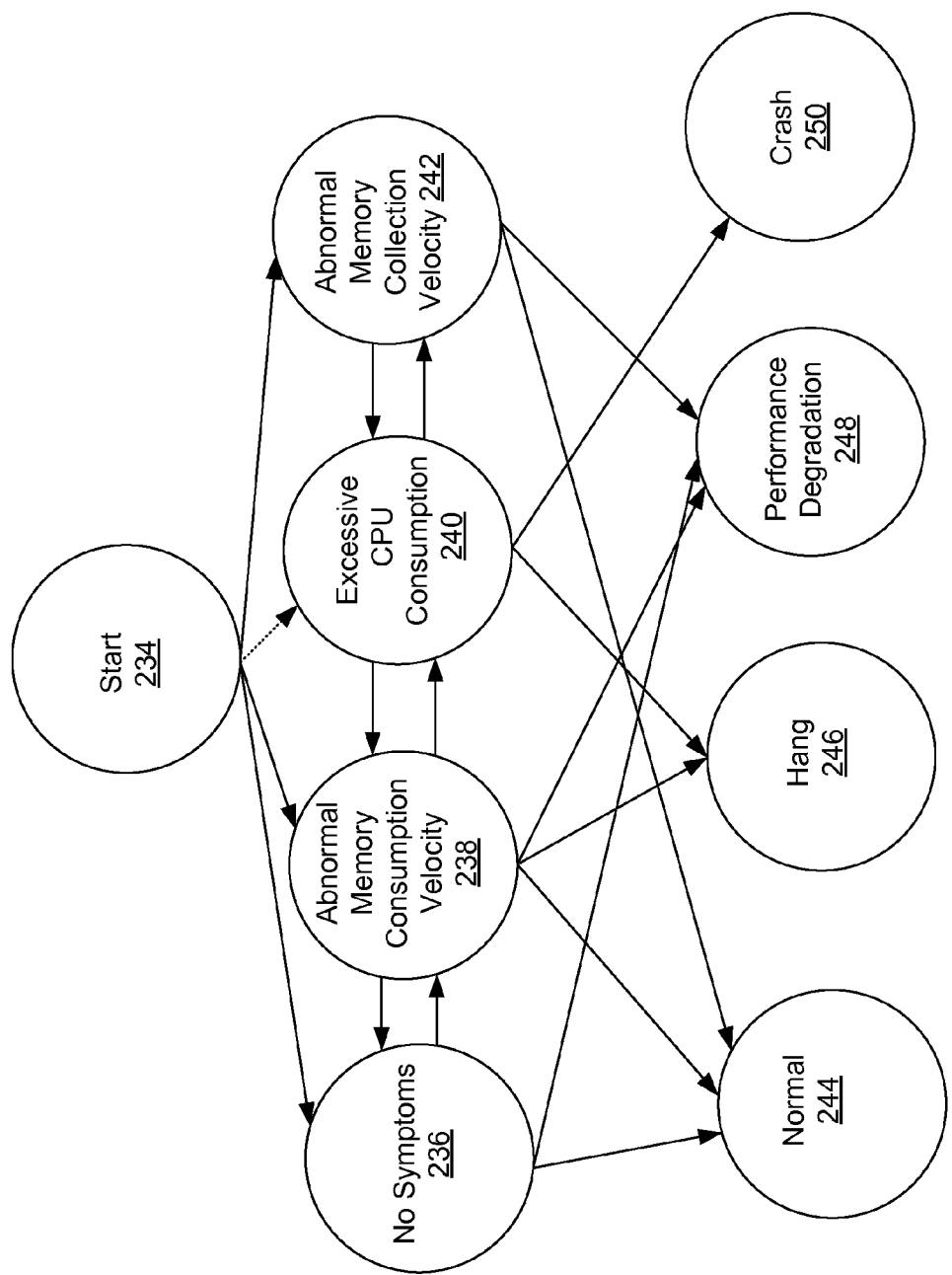
FIG. 6 is hidden Markov model output of predicted performance degradation based upon abnormal memory consumption velocity and excessive processing resource consumption.

FIG. 6 is hidden Markov model output of predicted performance degradation based upon abnormal memory consumption velocity and excessive processing resource consumption. From an initial start state 234 the observation spaces applied to a hidden Markov model transition matrix and emission matrix provide probabilities to achieve state spaces of normal 244, hang 246, performance degradation 248 and crash 250. The probability of reaching each of the state spaces depends upon the analysis of intermediate system operations reflected by intermediate states of no symptoms 236, abnormal memory consumption velocity 238, excessive CPU consumption 240, and abnormal memory collection velocity 242. Threshold probability values that trigger a response may depend upon the severity of the state space's impact on computer system operations. For example, a relatively small probability of entry into a crash state space 250 might trigger a corrective action that intercedes in the performance of the associated task or even initiates a recovery and reboot of the computer system. By comparison, a relatively high probability of a performance degradation state 248 may be needed to take correction action while a low value may provide an alarm to an information technology administrator.

Although the present invention has been described in detail, it should be understood that various changes, substitutions and alterations can be made hereto without departing from the spirit and scope of the invention as defined by the appended claims.

What is claimed is:

1. A method for monitoring computer system operations, the method comprising:
   tracking resource collection at the computer system over time;
   tracking resource consumption at the computer system over time;
   deriving resource collection velocity and acceleration from the resource collection;
   deriving resource consumption velocity and acceleration from the resource consumption;
   applying the resource consumption, resource consumption velocity, resource consumption acceleration, resource collection, resource collection velocity and resource collection acceleration as observation spaces in a hidden Markov model to predict computer system state spaces;
   comparing the computer system states with an alarm threshold; and
   issuing an alarm if the computer system state meets the alarm threshold.

2. The method of claim 1, further comprising:
   comparing the computer system states with a proactive response threshold; and
   performing a proactive response if the computer system state meets the proactive response threshold.

3. The method of claim 1, wherein resource collection comprises assignments of processor and memory resources to a task executing on the computer system.

4. The method of claim 1, wherein resource consumption comprises use of processor and memory resources by a task executing on the computer system.

5. The method of claim 1, wherein the computer system state spaces comprise a normal state, a resource contention state, a hang state, a performance degradation state and a crash state.

6. A system comprising:
   a processor;
   a data bus coupled to the processor; and
   a computer-usable medium embodying computer program code, the computer-usable medium being coupled to the data bus, the computer program code used for monitoring computer system operations and comprising instructions executable by the processor and configured for:
      tracking resource collection at the computer system over time;
      tracking resource consumption at the computer system over time;
      deriving resource collection velocity and acceleration from the resource collection;
      deriving resource consumption velocity and acceleration from the resource consumption;
      applying the resource consumption, resource consumption velocity, resource consumption acceleration, resource collection, resource collection velocity and resource collection acceleration as observation spaces in a hidden Markov model to predict computer system state spaces;
      comparing the computer system states with an alarm threshold; and
      issuing an alarm if the computer system state meets the alarm threshold.

7. The system of claim 6, wherein the instructions further comprise instructions configured for:
   comparing the computer system states with a proactive response threshold; and
   performing a proactive response if the computer system state meets the proactive response threshold.

8. The system of claim 6, wherein resource collection comprises assignments of processor and memory resources to a task executing on the computer system.

9. The system of claim 6, wherein resource consumption comprises use of processor and memory resources by a task executing on the computer system.

10. The system of claim 6, wherein the computer system state spaces comprise a normal state, a resource contention state, a hang state, a performance degradation state and a crash state.

11. A non-transitory, computer-readable storage medium embodying computer program code, the computer program code comprising computer executable instructions configured for:
    tracking resource consumption at the computer system over time;
    tracking resource collection at the computer system over time;
    deriving resource consumption velocity and acceleration from the resource consumption;
    deriving resource collection velocity and acceleration from the resource collection; and
    applying the resource consumption, resource consumption velocity, resource consumption acceleration, the resource collection, resource collection velocity and resource collection acceleration as observation spaces in a hidden Markov model to predict computer system state spaces;
    adjusting the predicted computer system state spaces with real time data by unsupervised learning with a Viterbi algorithm;
    comparing the computer system states with an alarm threshold; and
    issuing an alarm if the computer system state meets the alarm threshold.

12. The non-transitory, computer-readable storage medium of claim 11, wherein the instructions further comprise instructions configured for:
    comparing the computer system states with a proactive response threshold; and
    performing a proactive response if the computer system state meets the proactive response threshold.

13. The non-transitory, computer-readable storage medium of claim 11, wherein resource collection comprises assignments of processor and memory resources to a task executing on the computer system.

14. The non-transitory, computer-readable storage medium of claim 11, wherein resource consumption comprises use of processor and memory resources by a task executing on the computer system.

15. The non-transitory, computer-readable storage medium of claim 11, wherein the computer executable instructions are deployable to a client system from a server system at a remote location.

16. The non-transitory, computer-readable storage medium of claim 11, wherein the computer system state spaces comprise a normal state, a resource contention state, a hang state, a performance degradation state and a crash state.

* * * * *